United States Patent
Choi et al.

(10) Patent No.: US 8,323,849 B2
(45) Date of Patent: Dec. 4, 2012

(54) ELECTROLYTE MEMBRANE CONTAINING A CROSSLINKED POLYBENZOXAZINE-BASED COMPOUND FOR FUEL CELL AND FUEL CELL USING THE SAME

(75) Inventors: Seong-woo Choi, Yongin-si (KR); Jung-ock Park, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 2 days.

(21) Appl. No.: 11/947,011

(22) Filed: Nov. 29, 2007

(65) Prior Publication Data

US 2009/0117436 A1    May 7, 2009

(30) Foreign Application Priority Data

Nov. 2, 2007 (KR) .................. 10-2007-0111588

(51) Int. Cl.
  *H01M 4/02* (2006.01)
  *H01M 4/36* (2006.01)
  *H01M 8/10* (2006.01)

(52) U.S. Cl. ........ 429/494; 429/479; 429/482; 429/491; 429/492; 429/523; 429/529

(58) Field of Classification Search .................. 429/30, 429/33, 41–43, 479, 482, 491, 492, 494, 429/523, 529
See application file for complete search history.

(56) References Cited

U.S. PATENT DOCUMENTS

| | | |
|---|---|---|
| 4,828,699 A | 5/1989 | Soehngen |
| 5,098,985 A | 3/1992 | Harris et al. |
| 5,250,633 A | 10/1993 | Calundann et al. |
| 5,410,012 A | 4/1995 | Connell et al. |
| 5,525,436 A | 6/1996 | Savinell et al. |
| 5,637,670 A | 6/1997 | Connell et al. |
| 5,945,233 A | 8/1999 | Onorato et al. |
| 6,042,968 A | 3/2000 | Onorato et al. |
| 6,482,946 B1 | 11/2002 | Dettloff et al. |
| 6,620,905 B1 | 9/2003 | Musa |
| 6,855,674 B2 | 2/2005 | Gutierrez |
| 7,094,490 B2 | 8/2006 | Cao et al. |
| 7,157,509 B2 | 1/2007 | Li et al. |
| 7,371,480 B2 | 5/2008 | Ono et al. |
| 7,388,035 B2 | 6/2008 | Kim et al. |
| 7,405,021 B2 | 7/2008 | Gascoyne et al. |

(Continued)

FOREIGN PATENT DOCUMENTS

CN    101220153    7/2008

(Continued)

OTHER PUBLICATIONS

Machine translation of JP 2004103494 A.*

(Continued)

*Primary Examiner* — Basia Ridley
*Assistant Examiner* — Sean P Cullen
(74) *Attorney, Agent, or Firm* — Stein McEwen, LLP

(57) ABSTRACT

A fuel cell including an electrolyte membrane and/or an electrode which includes a crosslinked polybenzoxazine-based compound formed of a polymerized product of at least one selected from a first benzoxazine-based monomer and second benzoxazine-based monomer, the first benzoxazine-based monomer and second benzoxazine-based monomer having a halogen atom or a halogen atom-containing functional group, crosslinked with a cross-linkable compound.

25 Claims, 6 Drawing Sheets

U.S. PATENT DOCUMENTS

| | | | |
|---|---|---|---|
| 7,510,678 B2 | 3/2009 | Kim et al. | |
| 7,619,044 B2 | 11/2009 | Lee et al. | |
| 7,649,025 B2 | 1/2010 | Kitamura et al. | |
| 7,709,579 B2 | 5/2010 | Lehmann et al. | |
| 2001/0041283 A1 | 11/2001 | Hitomi | |
| 2002/0127474 A1 | 9/2002 | Fleischer et al. | |
| 2002/0164516 A1 | 11/2002 | Hasegawa et al. | |
| 2003/0190516 A1 | 10/2003 | Tanno | |
| 2004/0005493 A1 | 1/2004 | Tanno | |
| 2004/0028976 A1 | 2/2004 | Cabasso et al. | |
| 2004/0206953 A1 | 10/2004 | Morena et al. | |
| 2004/0231143 A1 | 11/2004 | Visco et al. | |
| 2004/0241522 A1 | 12/2004 | Ono et al. | |
| 2004/0261660 A1 | 12/2004 | Li et al. | |
| 2005/0074651 A1* | 4/2005 | Kidai et al. | 429/30 |
| 2005/0084728 A1 | 4/2005 | Kim et al. | |
| 2005/0089744 A1 | 4/2005 | Kim et al. | |
| 2005/0130006 A1 | 6/2005 | Hoshi et al. | |
| 2005/0142413 A1* | 6/2005 | Kimura et al. | 429/34 |
| 2005/0247908 A1 | 11/2005 | Keller et al. | |
| 2006/0078774 A1 | 4/2006 | Uensal et al. | |
| 2006/0241192 A1 | 10/2006 | Kitamura et al. | |
| 2007/0020507 A1 | 1/2007 | Kim et al. | |
| 2007/0141426 A1 | 6/2007 | Choi et al. | |
| 2007/0184323 A1 | 8/2007 | Lee et al. | |
| 2007/0200994 A1 | 8/2007 | Yanagisawa | |
| 2007/0238723 A1 | 10/2007 | Goble et al. | |
| 2007/0275285 A1 | 11/2007 | Choi et al. | |
| 2008/0020264 A1* | 1/2008 | Sun et al. | 429/41 |
| 2008/0045688 A1 | 2/2008 | Lin et al. | |
| 2008/0050633 A1 | 2/2008 | Kwon et al. | |
| 2008/0118817 A1 | 5/2008 | Lee et al. | |
| 2008/0145743 A1 | 6/2008 | Choi et al. | |
| 2008/0157422 A1 | 7/2008 | Lee et al. | |
| 2009/0075147 A1 | 3/2009 | Kitamura et al. | |
| 2009/0117436 A1 | 5/2009 | Choi et al. | |
| 2009/0117440 A1 | 5/2009 | Choi et al. | |
| 2010/0273087 A1 | 10/2010 | Choi et al. | |
| 2011/0189581 A1 | 8/2011 | Choi et al. | |

FOREIGN PATENT DOCUMENTS

| | | |
|---|---|---|
| DE | 2034 887 | 1/1972 |
| DE | 603 02 673 | 8/2006 |
| EP | 1 247 844 | 10/2002 |
| EP | 1 253 661 | 10/2002 |
| EP | 1 760 110 | 7/2007 |
| EP | 1 881 549 | 1/2008 |
| JP | 5-283082 | 10/1993 |
| JP | 10-25343 | 1/1998 |
| JP | 11-503262 | 3/1999 |
| JP | 11-97011 | 4/1999 |
| JP | 2001-19844 | 1/2001 |
| JP | 2001-270891 | 10/2001 |
| JP | 2001-271070 | 10/2001 |
| JP | 2002-260682 | 9/2002 |
| JP | 2003-12747 | 1/2003 |
| JP | 2003-12924 | 1/2003 |
| JP | 2003286320 A * | 10/2003 |
| JP | 2003-327694 | 11/2003 |
| JP | 2004-43547 | 2/2004 |
| JP | 2004103494 A * | 4/2004 |
| JP | 2004-149779 | 5/2004 |
| JP | 2004-179514 | 6/2004 |
| JP | 2005-41936 | 2/2005 |
| JP | 2005-82690 | 3/2005 |
| JP | 2005-283082 | 10/2005 |
| JP | 2006-339065 | 12/2006 |
| JP | 2007-70631 | 3/2007 |
| JP | 2007-214108 | 8/2007 |
| KR | 10-2006-0011831 | 2/2006 |
| KR | 10-2006-0055291 | 5/2006 |
| KR | 10-2007-0025626 | 3/2007 |
| KR | 10-2007-0025627 | 3/2007 |
| KR | 10-0745741 | 7/2007 |
| KR | 10-2007-0102579 | 10/2007 |
| WO | WO 96/13872 | 5/1996 |
| WO | WO 00/51992 | 9/2000 |
| WO | WO 02/14334 | 2/2002 |
| WO | WO 02/057279 | 7/2002 |
| WO | WO 03/072638 | 9/2003 |
| WO | WO 2004/009708 | 1/2004 |
| WO | WO 2004/101509 | 11/2004 |
| WO | WO 2005/000955 | 1/2005 |
| WO | WO 2006/132207 | 12/2006 |

OTHER PUBLICATIONS

Machine translation of JP 2003286320 A.*
Human translation of JP 2004103494 A, Kimura et al., Apr. 2004.*
Human translation of JP 2003286320 A, Takeichi et al., Oct. 2003.*
U.S. Appl. No. 11/743,778, filed May 3, 2007, Seong-woo Choi, Samsung SDI Co., Ltd.
U.S. Appl. No. 11/856,350, filed Sep. 17, 2007, Seong-woo Choi, Samsung Electronics Co., Ltd.
U.S. Appl. No. 11/514,254, filed Sep. 1, 2006, Seong-woo Choi et al., Samsung Electronics Co. Ltd.
U.S. Appl. No. 11/514,831, filed Sep. 5, 2006, Myung-jin Lee et al., Samsung Electronics Co. Ltd.
U.S. Appl. No. 12/247,338, filed Oct. 8, 2008, Seong-woo Choi et al., Samsung Electronics Co. Ltd.
U.S. Appl. No. 12/208,664, filed Sep. 11, 2008, Seong-woo Choi et al., Samsung Electronics Co. Ltd.
U.S. Appl. No. 12/263,011, filed Oct. 31, 2008, Seong-woo Choi et al., Samsung Electronics Co. Ltd.
U.S. Appl. No. 12/262,854, filed Oct. 31, 2008, Seong-woo Choi et al., Samsung Electronics Co. Ltd.
U.S. Appl. No. 12/266,039, filed Nov. 6, 2008, Seong-woo Choi et al., Samsung Electronics Co. Ltd.
U.S. Appl. No. 12/208,492, filed Sep. 11, 2008, Seong-woo Choi et al., Samsung Electronics Co. Ltd.
U.S. Appl. No. 11/765,033, filed Jun. 19, 2007, Hee-young Sun et al., Samsung Electronics Co. Ltd.
U.S. Appl. No. 11/765,056, filed Jun. 19, 2008, Kyung-jung Kwon et al., Samsung Electronics Co. Ltd.
U.S. Office Action dated Jul. 11, 2011, issued in corresponding U.S. Appl. No. 12/208,492.
Korean Office Action dated Oct. 6, 2010, issued in corresponding Korean Patent Application No. 10-2008-0099549.
212th ECS Meeting—Washington DC, Oct. 7-12, 2007, Program Information, B10—Proton Exchange Membrane Fuel Cells (PEMFC 7) Energy Technology/Physical and Analytical Electrochemistry/Battery/Industrial Electrochemistry and Electrochemical Engineering.
Japanese Office Action dated Jun. 21, 2011, issued in corresponding Japanese Patent Application No. 2007-309320.
U.S. Office Action dated Aug. 11, 2011, issued in corresponding U.S. Appl. No. 12/247,338.
U.S. Office Action dated Aug. 18, 2011, issued in corresponding U.S. Appl. No. 12/266,039.
U.S. Office Action dated Aug. 31, 2011, issued in corresponding U.S. Appl. No. 12/208,664.
U.S. Office Action dated Sep. 2, 2011, issued in corresponding U.S. Appl. No. 12/262,854.
U.S. Office Action dated Sep. 12, 2011, issued in corresponding U.S. Appl. No. 12/263,011.
Tarek Agag, Journal of Applied Polymer Science, vol. 100, pp. 3769-3777 (2006).
European Search Report dated Jul. 21, 2010 issued in corresponding European Patent Application No. 10164784.0.
European Search Report dated Jul. 21, 2010 issued in corresponding European Patent Application No. 10164785.7.
Seong-Woo Choi et al., "Synthesis, characterization and thermal degradation of functional benzoxazine monomers and polymers containing phenylphosphine oxide", Polymer Degradation and Stability 91 (2006), pp. 1166-1178.
Korean Office Action dated Jul. 21, 2010, issued in corresponding Korean Patent Application No. 10-2008-0089999.
Japanese Office Action dated Sep. 20, 2011, issued in corresponding Japanese Patent Application No. 2008-233675.
U.S. Office Action dated Nov. 14, 2011, issued in corresponding U.S. Appl. No. 12/208,492.

U.S. Office Action dated Dec. 12, 2011, issued in corresponding U.S. Appl. No. 12/263,011.

B. Antalek. "Using Pulsed Gradient Spin Echo NMR for Chemical Mixture Analysis: How to Obtain Optimum Results.", Concepts in Magnetic Resonance (2002) vol. 14(4), pp. 225-258.

S. Viel et al. "Diffusion-Ordered NMR Spectroscopy: A Versatile Tool for the Molecular Weight Determination of Uncharged Polysaccharides.", Biomacromolecules (2003) vol. 4, pp. 1843-1847.

D. A. Jayawickrama et al. "Polymer additives mixture analysis using pulsed-field gradient NMR spectroscopy.", Magn.Reson. Chem (1998), vol. 36, pp. 755-760.

K. Nishinari et al. "Soulution Properties of Pullulan.", Macromolecules (1991) vol. 24, pp. 5590-5593.

L.C. Van Gorkom et al. "Analysis of DOSY and GPC-NMR Experiments on Polymers by Multivariate Curve Resolution.", Journal of Magnetic Resonance (1998) vol. 130, pp. 125-130.

A. Chen et al. "Determination of Molecular Weight Distributions for Polymers by Diffusion-Ordered NMR.", J. Am. Chem. Soc. (1995) vol. 117, pp. 7965-7970.

Hajime Kimura et al. "Epoxy Resin Cured by Bisphenol a Based Benzoxazine.", Journal of Applied Polymer Science (1998), vol. 68, pp. 1903-1910.

Schuster, Martin F.H., et al., "Anhydrous Proton-Conducting Polymers", Annu. Rev. Mater. Res., vol. 33, 2003, pp. 233-261.

Yamada, M. et al., "Anhydrous proton conducting polymer electrolytes based on poly(vinylphosphonic acid)-heterocyclic composite material", Polymer, vol. 46, No. 9, 2005, pp. 2986-2992.

Pu, H., et al., "Proton Transport in Polybenzimidazole Blended with $H_3PO_4$ or $H_2SO_4$", J. Polymer Science, Part B: Polymer Physics, vol. 40, 2002, pp. 663-669.

Kim, Hyoung-Juhn et al. *Polybenzimidazoles for High Temperature Fuel Cell Application*. Macromol. Rapid Commun. 2004, vol. 25, pp. 1410-1413.

Ueda, Mitsuru et al. *Poly(benzimidazole) Synthesis by Direct Reaction of Methoxyphthalic Acids and Tetramine*. J. Poly. Sci. Part A: Polym. Chem, 27 pp. 2815-2818 (1989).

Choi et al., "Synthesis, characterization and thermal degradation of functional benzoxazine monomers and polymers containing phenylphosphine oxide", Polymer Degradation and Stability, vol. 91, No. 5. May 1, 2006, pp. 1166-1178.

Low, Hong Yee, et al. "Structural Effects of Phenols on the Thermal and Thermo-oxidative Degradation of Polybenzoxazines". Polymer, vol. 40, No. 15. Jul. 1999. pp. 4365-4376.

Kim, H.J., et al. "Synthesis and Thermal Characterization of Polybenzoxazines Based on Acetylene-functional Monomers". Polymer, vol. 40, No. 23. Nov. 1999. pp. 6565-6573.

Shen, Shyan Bob, et al. "Synthesis and Characterization of Polyfunctional Naphthoxazines and Related Polymers". Journal of Applied Polymer Science vol. 61, No. 9. 1996, pp. 1595-1605.

Lin et al., "Synthesis and Properties of Flame-Retardant Benzoxazines by Three Approaches", Journal of Polymer Science, Part A: Polymer Chemistry, vol. 44, 2006, pp. 3454-3468.

Hirai et al., "Air-Induced *anti*-Markovnikov Addition of Secondary Phosphine Oxides and H-Phosphinates to Alkenes", National Institute of Advanced Industrial Science and Technology, Organic Letters 2007, vol. 9, No. 1, pp. 53-55.

Beletskaya et al., "Arylation of 6*H*-Dibenzo[c,e][1,2 $\lambda^5$]oxaphosphinine 6-Oxide", Russian Journal of Organic Chemistry, vol. 40, No. 12, 2004, pp. 1782-1786.

Yamada et al., "A Novel Synthesis of 6-Hydroxyalkyl- and 6-Hydroxy-aralkyl-6*H*-dibenz[c,e][1,2]oxaphosphorin 6-Oxides", vol. 27, 1990, pp. 845-850.

Machine translation of JP 2004-149779, Sakaguchi et al., May 2004.

European Search Report issued in European Patent Application No. 062545512-2115 on Nov. 21, 2006.

European Office Action issued in corresponding European Patent Application No. 07250814.6 on Oct. 30, 2007.

European Search Report issued in European Patent Application No. 08157494.9 on Nov. 24, 2008.

European Office Action issued in corresponding EP Application No. 08164095.5 on Dec. 4, 2008.

European Search Report issued in European Patent Application No. 08164096.3 on Jan. 20, 2009.

European Search Report issued in European Patent Application No. 08166328.8 on Jan. 22, 2009.

European Search Report issued in European Patent Application No. 08168081.1 on Jan. 28, 2009.

Extended European Search Report issued in European Patent Application No. 08168032.4 on Feb. 3, 2009.

European Search Report issued in European Patent Application No. 08168404.5 on Feb. 10, 2009.

Extended European Search Report issued in European Patent Application No. 08168404.5 on Apr. 23, 2009.

Japanese Office Action issued in Japanese Patent Application No. 2006-239572 on Feb. 17, 2009.

US Office Action issued in corresponding U.S. Appl. No. 11/514,254 on Jan. 8, 2010.

US Office Action issued in corresponding U.S. Appl. No. 11/514,254 on May 6, 2010.

US Office Action issued in corresponding U.S. Appl. No. 11/765,033 on Sep. 8, 2009.

US Office Action issued in corresponding U.S. Appl. No. 11/765,033 on Jun. 17, 2010.

US Office Action issued in corresponding U.S. Appl. No. 11/743,778 on Sep. 3, 2009.

US Office Action issued in corresponding U.S. Appl. No. 11/743,778 on Feb. 19, 2010.

US Office Action issued in corresponding U.S. Appl. No. 11/765,056 on Jun. 1, 2010.

Seong-Woo Choi, et al., Polybenzoxazine Based Membrane with Enhanced Oxygen Permeability Inducing Fluorine Containing Benzoxazine Monomer as an Electrode Additive and Binder for High Temperature PEM Fuel Cells; slides of presentation at 212th ECS, Washington, DC, Oct. 9, 2007.

U.S. Notice of Allowance dated Jan. 31, 2012, issued in corresponding U.S. Appl. No. 12/266,039.

U.S. Office Action dated Feb. 2, 2012, issued in corresponding U.S. Appl. No. 12/208,664.

U.S. Notice of Allowance dated Feb. 3, 2012, issued in corresponding U.S. Appl. No. 12/208,492.

U.S. Notice of Allowance dated Feb. 3, 2012, issued in corresponding U.S. Appl. No. 12/262,854.

STN Registry database entries for RN 35141-82-3, RN 35141-83-4 and RN 35141-84-5, Database entry date Nov. 16, 1984. Accessed Jan. 26, 2012.

U.S. Office Action dated Dec. 22, 2011, issued in corresponding U.S. Appl. No. 12/247,338.

Japanese Office Action dated Oct. 23, 2011, issued in corresponding Japanese Patent Application No. 2007-309320.

\* cited by examiner

ELECTROLYTE MEMBRANE CONTAINING A CROSSLINKED POLYBENZOXAZINE-BASED COMPOUND FOR FUEL CELL AND FUEL CELL USING THE SAME

CROSS-REFERENCE TO RELATED APPLICATION

This application claims the benefit of Korean Patent Application No. 2007-111588, filed on Nov. 2, 2007, in the Korean Intellectual Property Office, the disclosure of which is incorporated herein by reference.

BACKGROUND OF THE INVENTION

1. Field of the Invention

Aspects of the present invention relate to an electrolyte membrane for a fuel cell and a fuel cell using the same.

2. Description of the Related Art

Fuel cells, which use a polymer electrolyte membrane as an electrolyte, operate at a relatively low temperature and can be small in size. Thus, such fuel cells are expected to be used as energy sources in electric vehicles or distributed generation systems in homes. As a polymer electrolyte membrane used in polymer electrolyte fuel cells, a perfluorocarbon sulfonic acid-based polymer membrane available as NAFION® available from E.I. du Pont de Nemours and Company is used.

However, such polymer electrolyte membranes require water in order to sufficiently conduct protons, and thus the polymer electrolyte membranes require humidification. In addition, to enhance cell system efficiencies, it is necessary to operate polymer electrolyte membranes at a high temperature, i.e., at least 100° C. However, the moisture in the polymer electrolyte membrane is evaporated at such temperatures, and polymer electrolyte membranes cannot function as a solid electrolyte.

To address such problems in the related art, non-humidified electrolyte membranes, which can operate at a high temperature of at least 100° C. without humidification, have been developed. For example, Japanese Patent Laid-Open Publication No. 11-503262 discloses a polybenzimidazole doped with a phosphoric acid, and the like, as a material for use as a non-humidified electrolyte membrane.

In addition, in cells which operate at a low temperature, such as the cells using a perfluorocarbon sulfonic acid-based polymer membrane, electrodes using polytetrafluoroethylene (PTFE) as a waterproof agent having hydrophobic properties have been widely used to prevent gas diffusion in the electrodes due to formation of water produced as electricity is generated in an electrode, particularly a cathode. For example, Japanese Patent Laid-Open Publication No. 05-283082 discloses use of such electrodes.

In addition, phosphoric acid fuel cells operating at a high temperature, i.e., 150 to 200° C., use a liquid phosphoric acid as an electrolyte. However, a large amount of the liquid phosphoric acid therein interferes with gas diffusion in the electrodes. Therefore, an electrode catalyst layer including a polytetrafluoroethylene (PTFE) as a waterproof agent, which prevents fine pores in the electrodes from being clogged by the phosphoric acid, has been used.

In addition, in fuel cells using a polybenzimidazole (PBI) electrolyte membrane, which uses a phosphoric acid as a nonhumidified electrolyte at a high temperature to reduce contact between electrodes and the electrolyte membrane, a method of impregnating the electrodes with a liquid phosphoric acid has been used and a method of increasing a loading amount of metal catalysts has been used. However, such fuel cells do not exhibit improved properties. In addition, the electrolyte membrane formed of PBI does not have satisfactory mechanical properties, chemical stability, or the capability of containing a phosphoric acid. Thus, there is still a need for improvement.

SUMMARY OF THE INVENTION

Aspects of the present invention provide a fuel cell in which an electrolyte membrane is formed of a benzoxazine-based compound having a functional group containing a halogen atom, such as fluorine, or the polymer thereof, or both an electrolyte membrane and an electrode formed of a benzoxazine-based compound having a functional group containing a halogen atom, such as fluorine, or the polymer thereof resulting in improved cell performance.

According to an aspect of the present invention, there is provided an electrolyte membrane for a fuel cell, which comprises a crosslinked polybenzoxazine-based compound formed of at least one monomer selected from a first benzoxazine-based monomer represented by Formula 1 below and a second benzoxazine-based monomer represented by Formula 2 below crosslinked with a cross-linkable compound.

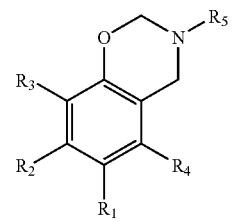

<Formula 1>

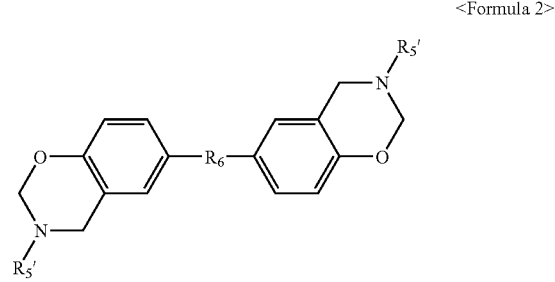

<Formula 2>

According to another aspect of the present invention, there is provided a fuel cell comprising a cathode, an anode, and the electrolyte membrane for a fuel cell described above which is disposed therebetween.

According to aspects of the present invention, $R_1$ through $R_4$ are each independently hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ cycloalkyl group, a substituted or unsubstituted $C_4$-$C_{20}$ cycloalkyloxy group, a substituted or unsubstituted $C_2$-$C_{20}$ heterocycle group, a halogen atom, a hydroxyl group, or a cyano group.

According to aspects of the present invention, $R_5$ is a halogenated $C_1$-$C_{20}$ alkyl group, a halogenated $C_1$-$C_{20}$ alkoxy group, a halogenated $C_2$-$C_{20}$ alkenyl group, a halogenated $C_2$-$C_{20}$ alkynyl group, a halogenated $C_6$-$C_{20}$ aryl group, a halogenated $C_6$-$C_{20}$ aryloxy group, a halogenated $C_7$-$C_{20}$ arylalkyl group, a halogenated $C_2$-$C_{20}$ heteroaryl group, a halogenated $C_2$-$C_{20}$ heteroaryloxy group, a halogenated $C_2$-$C_{20}$ heteroarylalkyl group, a halogenated $C_4$-$C_{20}$ carbocycle group, a halogenated $C_4$-$C_{20}$ carbocyclicalkyl group, a halogenated $C_2$-$C_{20}$ heterocycle group, or a halogenated $C_2$-$C_{20}$ heterocyclicalkyl group.

According to aspects of the present invention, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocycle group, a substituted or unsubstituted $C_4$-$C_{20}$ carbocyclicalkyl group, a substituted or unsubstituted $C_2$-$C_{20}$ heterocycle group, or a substituted or unsubstituted $C_2$-$C_{20}$ heterocyclicalkyl group.

According to aspects of the present invention, $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—, According to aspects of the present invention, at least one of $R_5'$ and $R_6$ is a halogenated substituent.

According to aspects of the present invention, at least one of the cathode and anode may have a catalyst layer comprising a polymer of at least one selected from the first benzoxazine-based monomer of Formula 1 and the second benzoxazine-based monomer of Formula 2 and a catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
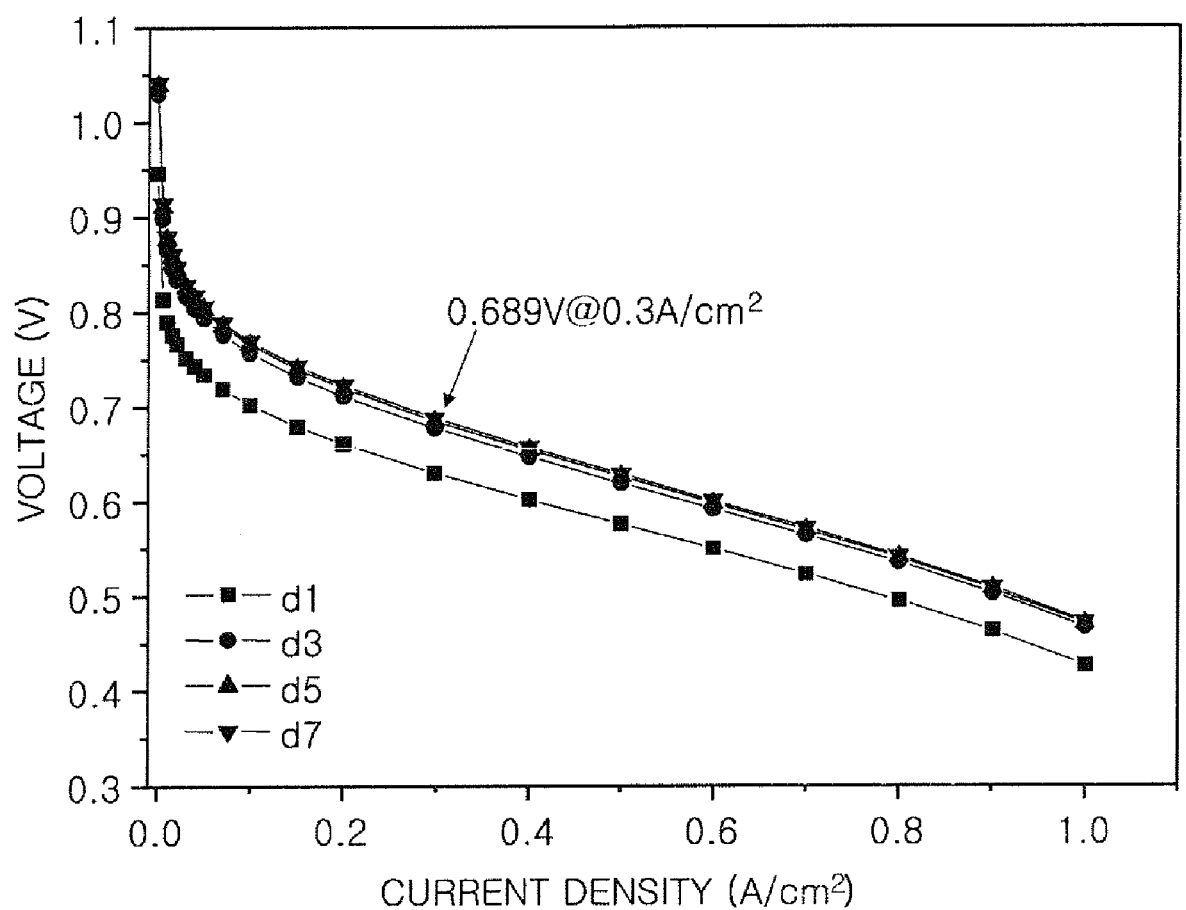
FIG. 1 is a graph of voltage with respect to current density of the fuel cell of Example 1 according to aspects of the present invention.

Reference will now be made in detail to the present embodiments of the invention, examples of which are illustrated in the accompanying drawings, wherein like reference numerals refer to the like elements throughout. The embodiments are described below in order to explain aspects of the present invention by referring to the figures. When it is stated that the electrolyte membrane includes a polymerized product of at least one monomer selected from a first and a second monomer, it is intended to refer to first monomer, the second monomer, or both the first and second monomers.

Aspects of the present invention provide an electrolyte membrane which includes a crosslinked polybenzoxazine-based compound formed of a polymerized product of at least one monomer selected from a first benzoxazine-based monomer represented by Formula 1 below and a second benzoxazine-based monomer represented by Formula 2 below crosslinked with a cross-linkable compound:

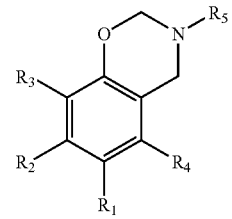

<Formula 1>

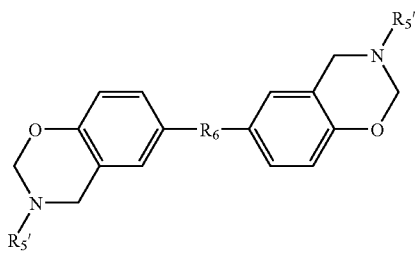

<Formula 2> wherein $R_1$ through $R_4$ are each independently hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ cycloalkyl group, a substituted or unsubstituted $C_4$-$C_{20}$ cycloalkyloxy group, a substituted or unsubstituted $C_2$-$C_{20}$ heterocycle group, a halogen atom, a hydroxyl group, or a cyano group.

$R_5$ is a halogenated $C_1$-$C_{20}$ alkyl group, a halogenated $C_1$-$C_{20}$ alkoxy group, a halogenated $C_2$-$C_{20}$ alkenyl group, a halogenated $C_2$-$C_{20}$ alkynyl group, a halogenated $C_6$-$C_{20}$ aryl group, a halogenated $C_6$-$C_{20}$ aryloxy group, a halogenated $C_7$-$C_{20}$ arylalkyl group, a halogenated $C_2$-$C_{20}$ heteroaryl group, a halogenated $C_2$-$C_{20}$ heteroaryloxy group, a halogenated $C_2$-$C_{20}$ heteroarylalkyl group, a halogenated $C_4$-$C_{20}$ carbocycle group, a halogenated $C_4$-$C_{20}$ carbocyclicalkyl group, a halogenated $C_2$-$C_{20}$ heterocycle group, or a halogenated $C_2$-$C_{20}$ heterocyclicalkyl group.

$R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocycle group, a substituted or unsubstituted $C_4$-$C_{20}$ carbocyclicalkyl group, a substituted or unsubstituted $C_2$-$C_{20}$ heterocycle group, or a substituted or unsubstituted $C_2$-$C_{20}$ heterocyclicalkyl group.

$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—.

Further, according to aspects of the present invention, at least one of $R_5'$ and $R_6$ is a halogenated substituent.

The cross-linkable compound used may be at least one selected from polybenzimidazoles (PBI), a polybenzimidazole-base complex, polybenzthiazoles, polybenzoxazoles, and polyimides.

When the cross-linkable compound is PBI or the polybenzimidazole-base complex, an electrolyte membrane according to an embodiment of the present invention comprises a crosslinked polybenzoxazine-based compound formed of a polymerized product of polybenzoxazine together with PBI or the polybenzimidazole-base complex.

The electrolyte membrane having the above-described composition reduces problems caused when an electrolyte membrane formed of polybenzimidazole alone is used, such as, a pin-hole phenomenon caused by mechanical and chemical instability at a high temperature of the electrolyte membrane including only polybenzimidazole. In addition to this, when the electrode comprises, as described above, a halogen-containing benzoxazine-based monomer, particularly, the polymer of a fluorine-containing benzoxazine-based monomer, the transmission of oxygen into the electrode is increased, and thus the amount of oxygen dissolved in the electrode is increased, resulting in a reduction in the activation time of the electrode. In particular, when $R_5$ is a fluorine-substituted phenyl group, the advantages of a fluorine-containing polymer, such as excellent oxygen transmission, thermal resistance, and resistance to phosphoric acid can be obtained, and the compatibility of three-phases, that is, gas phase (fuel gas or oxidized gas)-liquid phase (phosphoric acid)-solid phase (catalyst) can be enhanced.

Aspects of the present invention also provide a fuel cell including an electrode which comprises a catalyst and a polymer of at least one selected from the first benzoxazine-based monomer of Formula 1 and the second benzoxazine-based monomer of Formula 2.

In Formula 1, $R_5$ may be a fluorinated functional group, and may be one of the groups represented by following formulae:

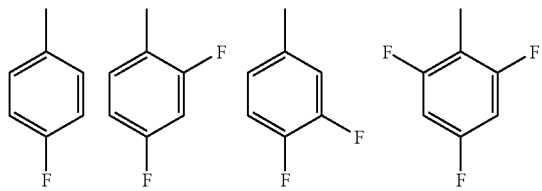

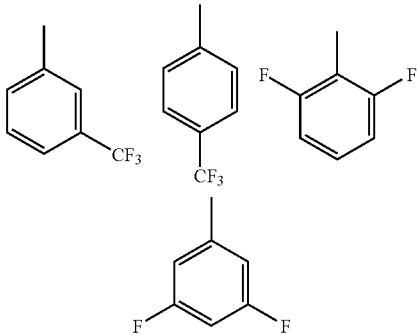

In Formula 1, $R_1$ through $R_4$ may be each independently hydrogen, F, a $C_1$-$C_{10}$ alkyl group, an allyl group, or a $C_6$-$C_{10}$ aryl group. In addition, in Formula 2, $R_6$ may be —C(CF$_3$)$_2$—, —SO$_2$—, or —C(CH$_3$)$_2$—, and $R_5'$ may be a phenyl group, and may be one of the same groups as the fluorinated functional groups of $R_5$ described above represented by the following formulae:

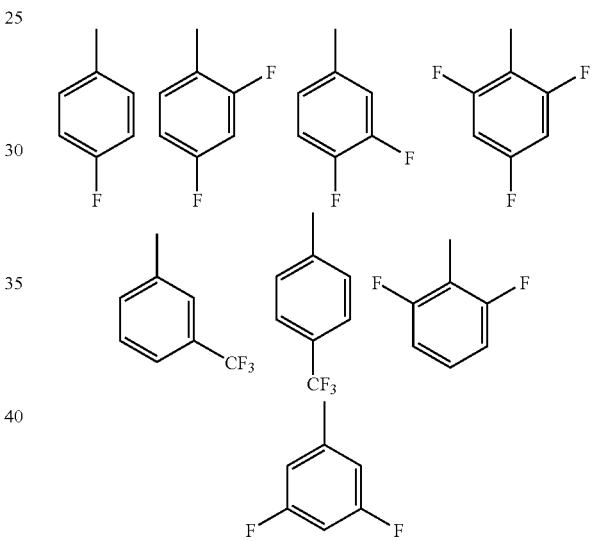

As described above, in Formula 2, at least one of $R_5'$ and $R_6$ may be a halogenated substituent, and may be a fluorinated substituent.

The first benzoxazine-based monomer of Formula 1 may be a compound represented by Formula 3 or 4 below.

<Formula 3>

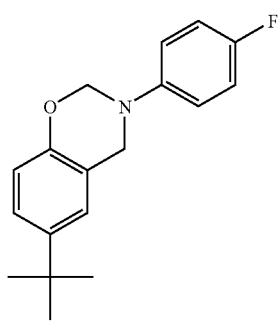

<Formula 4>

In addition, the second benzoxazine-based monomer of Formula 2 may be a compound represented by Formula 5 below.

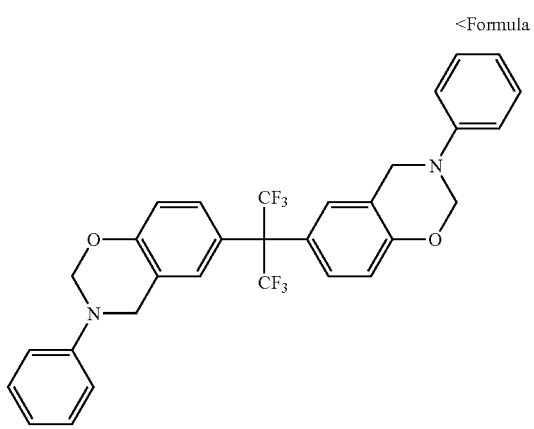

<Formula 5>

The fuel cell according to aspects of the present invention includes an electrolyte membrane formed of an optimized material or includes an electrolyte membrane and electrode formed of optimized materials, thereby exhibiting improved cell performance.

In the electrode according to aspects of the present invention, the amount of the at least one polymer selected from the first benzoxazine-based monomer of Formula 1 and the second benzoxazine-based monomer of Formula 2 may be in the range of 0.1 to 50 parts by weight based on 100 parts by weight of the catalyst.

When the amount of the polymer of at least one selected from the first benzoxazine-based monomer of Formula 1 and the second benzoxazine-based monomer of Formula 2 is less than 0.1 parts by weight based on 100 parts by weight of the catalyst, the effect of an additive or binder is insignificant. On the other hand, when the amount of the polymer of at least one selected from the first benzoxazine-based monomer of Formula 1 and the second benzoxazine-based monomer of Formula 2 is greater than 50 parts by weight based on 100 parts by weight of the catalyst, an interfacial resistance is increased.

The catalyst may be platinum alone, or an alloy or mixture of platinum and at least one metal selected from the group consisting of gold, palladium, rhodium, iridium, ruthenium, tin, molybdenum, cobalt, and chrome.

The electrode may further include a binder which can be conventionally used in the preparation of an electrode for a fuel cell.

The binder may be at least one selected from the group consisting of poly(vinylidenefluoride), polytetrafluoroethylene (PTFE), tetrafluoroethylene-hexafluoroethylene copolymer, fluorinated ethylene propylene (FEP), styrene butadiene rubber (SBR), and polyurethane. The amount of the binder may be in the range of 0.1 to 50 parts by weight based on 100 parts by weight of the catalyst. When the amount of the binder is less than 0.1 parts by weight based on 100 parts by weight of the catalyst, the adhesion between electrodes is poor such that it is difficult to maintain the shape of a catalyst layer. On the other hand, when the amount of the binder is greater than 50 parts by weight based on 100 parts by weight of the catalyst, an electric resistance in the electrode is increased.

The polybenzimidazole-base complex which can be used herein as the cross-linkable compound is the compound disclosed in Korean Patent No. 2007-102579 filed by the present applicant. The polybenzimidazole-base complex is produced by reacting a polybenzimidazole solution in which a polybenzimidazole-based material is dissolved in an organic solvent with a base, and then heat treating the resultant.

The base may be a weak base, and may be at least one carbonate selected from the group consisting of sodium carbonate ($Na_2CO_3$), sodium hydrogen carbonate ($NaHCO_3$), potassium carbonate ($K_2CO_3$), potassium hydrogen carbonate ($KHCO_3$), lithium carbonate ($Li_2CO_3$), rubidium carbonate ($Rb_2CO_3$), cesium carbonate ($Cs_2CO_3$), ammonium carbonate (($NH_4)_2CO_3$), and ammonium hydrogen carbonate (($NH_4)HCO_3$). The amount of the base may be in the range of 0.01 to 20 parts by weight based on 100 parts by weight of the polybenzimidazole-based material.

When the amount of the base is less than 0.01 parts by weight based on 100 parts by weight of the polybenzimidazole-based material, the polybenzimidazole-base complex is not completely formed. On the other hand, when the amount of the base is greater than 20 parts by weight based on 100 parts by weight of the polybenzimidazole-based material, the viscosity of the base is increased, and thus the base may not be uniformly dispersed in the complex.

The polybenzimidazole-based material may be poly[2,2'-(m-phenylene)-5,5'-bibenzimidazole] (PBI) or poly(2,5-benzimidazole) (ABPBI).

The formation of the polybenzimidazole-base complex can be confirmed through nuclear magnetic resonance spectrometry (NMR). An analyzer used in an NMR analysis is a Bruker NMR 300 MHz (model name: DPX 300) commercially available from Bruker Biospin. The NMR analysis was performed using a sample, 0.8 ml of a resultant solution prepared by dissolving 10 mg of the polybenzimidazole-base complex in 0.7 mL of DMSO-d6. In addition, a thermogravimetric analysis (TGA) is performed using a TGA 2050 commercially available from TA Instruments, performed at a temperature in the range of room temperature to 1000° C. (10° C./min), and performed using a Pt pan under a nitrogen ($N_2$) gas atmosphere.

The thermal decomposition initiation temperature of the polybenzimidazole-base complex prepared by the above-described preparation process may be in the range of 180 to 220° C., and preferably about 200° C. In addition, the thermal decomposition rate of the polybenzimidazole-base complex at a heating temperature of 20 to 1000° C. may be in the range of 8 to 15° C./min, and preferably about 10° C./min, and a 10% weight loss temperature in the TGA curve is in the range of 200 to 280° C., and particularly about 250° C.

The thermal decomposition initiation temperature, thermal decomposition rate, and 10% weight loss temperature in the TGA curve are measured using the TGA analyzer (TGA 2050) available from TA Instruments, and measured at a heating rate of 8 to 15° C./min, particularly 10° C./min under a nitrogen gas atmosphere.

The polybenzimidazole-base complex may have a ratio of weight average molecular weight to number average molecular weight ($M_w/M_n$, referred to as "molecular weight distribution") of 2.1 to 2.5, and preferably about 2.4. The polybenzimidazole-base complex has a weight average molecular weight of 65,000 to 70,000, preferably about 69,000, has a number average molecular weight of 25,000 to 30,000, preferably about 29,000, and has a viscosity average molecular weight of 80,000 to 83,000, preferably about 82,000.

The weight average molecular weight, number average molecular weight, and viscosity average molecular weight are measured by a gel permeation chromatography (GPC) method. An analyzer used in the measurement of the molecular weights is the TDA 302 available from Viscotek GPCmax. In the GPC analysis, an eluent is dimethylformamide (DMF) and 0.1 wt % of LiBr, a column is PLGel Mixed-C*2 (temp: 40° C.), a flow rate is about 1 ml/min, and an injection volume is about 100 μl.

In addition, the polybenzimidazole-base complex does not have a peak corresponding to a peak of NH of imidazole of a general polybenzimidazole-based material, at a chemical shift of 12 to 15 ppm, which was determined using $^1$H nuclear magnetic resonance ($^1$H-NMR) spectrometry. A peak is detected at a chemical shift of 9.15±0.5 (s, 1H), 8.30±0.5 (d, 2H), 7.92±0.5 (s, 1H), 7.75±0.5 (m, 3H), and 7.62±0.5 (m, 3H) using $^1$H-NMR operating at 300 MHz. Using $^1$H-NMR operating at 300 MHz, it can be seen that an NH peak at a chemical shift of 12 to 15 ppm, particularly around about 14 ppm, which is apparent before the formation of the polybenzimidazole-base complex, disappears, and simultaneously, peaks of polybenzimidazole are accurately split in the range of 8.2 to 7.4 ppm to correspond to integration values.

The NH peak at a chemical shift of 12 to 15 ppm, particularly around about 14 ppm, disappears in the polybenzimidazole-based material because that the polybenzimidazole-based material reacts with the base, and while the resultant is heat treated, —NH— of polybenzimidazole participates in the reaction, thereby changing the magnetic characteristics in an environment surrounding H. In the NMR analysis, a solvent used for dissolving the polybenzimidazole-base complex may be DMSO-d6, DMF-d6, or the like, and preferably DMSO-d6.

A device used in the NMR analysis is the DPX 300 available from Bruker Biospin, and a solvent used in the NMR analysis for dissolving the polybenzimidazole-base complex is DMSO-d6.

The amount of a metal ion (for example, $Na^+$, $K^+$, $Ca^{2+}$, and the like) measured by inductively coupled plasma (ICP) analysis of the polybenzimidazole-base complex may be in the range of 300 to 1,200 ppm, and preferably in the range of 323 to 1,170 ppm. A device used in the ICP analysis is the ICPS-8100 sequential spectrometer available from Shimadzu.

The amount of the cross-linkable compound used in the preparation of the electrolyte membrane according to aspects of the present invention may be in the range of 5 to 95 parts by weight based on 100 parts by weight of the at least one polymer selected from the first benzoxazine-based monomer and the second benzoxazine-based monomer.

When the amount of the cross-linkable compound is less than 5 parts by weight based on 100 parts by weight of the at least one polymer selected from the first benzoxazine-based monomer and the second benzoxazine-based monomer, the electrolyte membrane is not impregnated with a phosphoric acid, and thus, proton conductivity of the electrolyte membrane is reduced. On the other hand, when the amount of the cross-linkable compound is greater than 95 parts by weight based on 100 parts by weight of the at least one polymer selected from the first benzoxazine-based monomer and the second benzoxazine-based monomer, the crosslinking agent is dissolved in polyphosphoric acid due to the presence of excessive phosphoric acid so that gas permeation occurs.

The $C_1$-$C_{20}$ alkyl group used herein may be methyl, ethyl, propyl, isobutyl, sec-butyl, pentyl, iso-amyl, hexyl, or the like. At least one hydrogen atom of the alkyl group may be substituted with a halogen atom, a $C_1$-$C_{20}$ alkyl group substituted with a halogen atom (for example, $CCF_3$, $CHCF_2$, $CH_2F$, $CCl_3$, and the like), a hydroxyl group, a nitro group, a cyano group, an amino group, an amidino group, hydrazine, hydrazone, a carboxyl group or a salt thereof, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_1$-$C_{20}$ heterocycle group, or a $C_6$-$C_{20}$ heteroarylalkyl group.

The aryl group used herein is used alone or in combination, and refers to a $C_6$-$C_{20}$ carbocyclic aromatic system containing at least one ring, wherein the rings can be attached to each other using a pedant method or fused with each other. The term "aryl" refers to an aromatic radical, including phenyl, naphthyl, tetrahydronaphthyl, or the like. At least one hydrogen atom of the aryl group may be substituted with the same substituent as in the alkyl group described above.

The aryloxy group used herein may be a phenoxy group, a naphthyloxy group, a tetrahydronaphthyloxy group, or the like. At least one hydrogen atom of the aryloxy group may be substituted with the same substituent as in the alkyl group described above.

The heteroaryl group used herein refers to a monovalent, monocyclic, or bicyclic aromatic bivalent organic compound which contains 1, 2 or 3 heteroatoms selected from the group consisting of N, O, P, and S and has 1 to 20 carbon atoms. The heteroaryl may be pyrazinyl, furanyl, thienyl, pyridyl, pyrimidinyl, isothiazolyl, oxazolyl, thiazolyl, triazolyl, 1,2,4-thiadiazolyl, or the like. At least one hydrogen atom of the heteroaryl group may be substituted with the same substituent as in the alkyl group described above. In addition, the halogenated heteroaryl group used herein refers to a heteroaryl group substituted with a heteroatom such as fluorine, chlorine, and the like.

The heteroaryloxy group used herein may be pyrazinyloxy, furanyloxy, thienyloxy, pyridyloxy, pyrimidinyloxy, isothiazolyloxy, oxazolyloxy, thiazolyloxy, triazolyloxy, 1,2,4-thiadiazolyloxy, or the like. At least one hydrogen atom of the heteroaryloxy group may be substituted with the same substituent as in the alkyl group described above. The halogenated heteroaryloxy group used herein refers to a heteroaryloxy group substituted with a hetero atom such as fluorine, chlorine, and the like.

The heterocycle group used herein refers to a 5 to 10 membered ring group containing a heteroatom such as nitrogen, sulfur, phosphorus, oxygen, and the like. At least one hydrogen atom of the heterocycle group may be substituted with the same substituent as in the alkyl group described above. In addition, the halogenated heterocycle group used herein refers to a heterocycle group substituted with a hetero atom such as fluorine, chlorine, and the like.

The cycloalkyl group used herein may be a cyclohexyl group, a cyclopentyl group, or the like. At least one hydrogen atom of the cycloalkyl group may be substituted with the same substituent as in the alkyl group described above. In addition, the halogenated cycloalkyl group used herein refers to a cycloalkyl group substituted with a hetero atom such as fluorine, chlorine, and the like.

Hereinafter, a method of preparing a fuel cell according to an embodiment of the present invention will be described. First, a method of preparing an electrode is as follows:

First, a catalyst is dispersed in a solvent to obtain a dispersion. The solvent used is N-methylpyrolidone (NMP), dimethylformamide (DMAc), or the like, and the amount of the solvent is in the range of 100 to 1,000 parts by weight based on 100 parts by weight of the catalyst.

A mixture of a solvent and at least one selected from the first benzoxazine-based monomer of Formula 1 and the second benzoxazine-based monomer of Formula 2 is added to the dispersion and mixed together, and then the resultant is stirred. The mixture may further include a binder. The solvent is N-methylpyrolidone (NMP), dimethylacetamide (DMAc), or the like.

The resultant is coated on the surface of a carbon support to prepare an electrode. Herein, the carbon support may be fixed on a glass substrate in order to easily coat the resultant thereon. The coating method is not particularly limited, but, may be coated using a doctor blade, bar coating, screen printing, or the like.

The coated resultant is dried at a temperature in the range of 20 to 150° C., wherein the drying process is performed to remove the solvent. The drying time is dependent upon the drying temperature, and is in the range of 10 to 60 minutes.

As can be seen in the method of preparing an electrode described above, the electrode for a fuel cell, which is finally obtained, contains a polymer of at least one selected from the first benzoxazine-based monomer of Formula 1 and the second benzoxazine-based monomer of Formula 2. Herein, at least one selected from the first benzoxazine-based monomer of Formula 1 and the second benzoxazine-based monomer of Formula 2 is polymerized during the drying process described above and/or while a fuel cell including the electrode operates, thereby being converted to a polymer thereof.

Next, a method of preparing an electrolyte membrane according to an embodiment of the present invention is as follows:

A method of preparing an electrolyte membrane using polybenzimidazole as a cross-linkable compound will be described.

As a first method, at least one selected from the first benzoxazine-based monomer of Formula 1 and the second benzoxazine-based monomer of Formula 2 described above and the cross-linkable compound such as PBI or a PBI-base complex are blended, and then the mixture is hardened at a temperature in the range of 50 to 250° C., and particularly in the range of 80 to 220° C. Subsequently, the resultant is impregnated with a proton conductor, such as an acid, to form an electrolyte membrane.

As a second method, at least one selected from the first benzoxazine-based monomer of Formula 1 and the second benzoxazine-based monomer of Formula 2 and the cross-linkable compound such as PBI or a PBI-base complex are mixed together. Using the mixture, an electrolyte membrane is formed.

The formation of the electrolyte membrane may be performed by a tape casting method, or a conventional coating method. The conventional coating method may be a method in which the mixture is cast on a support using a doctor blade. Herein, a doctor blade with a 250 to 500 µm gap is used. When the casting method using a doctor blade is used, the process of forming the electrolyte membrane further includes separating the electrolyte membrane from the support, between the time when hardening of the mixture occurs and the time when impregnation of the resultant with acid occurs. When it is time to perform the process of separating the electrolyte membrane from the support, the mixture is immersed in distilled water with a temperature in the range of 60 to 80° C.

The support can be any support which can support an electrolyte membrane, for example, a glass substrate, a polyimide film, and the like. When the tape casting method is used, a tape cast membrane is separated on a support such as polyethyleneterephthalate before being hardened, and then put into an oven. In addition, when a membrane is formed by the tape casting method using a mixture of a benzoxazine-based monomer and polybenzimidazole, a process of filtering the mixture may be further performed. The tape cast membrane is hardened by heat treatment, and then impregnated with a proton conductor, such as an acid, to form an electrolyte membrane.

Nonrestrictive examples of the proton conductor include a phosphoric acid, a $C_1$-$C_{10}$ alkyl phosphonic acid, and the like. The $C_1$-$C_{10}$ alkyl phosphonic acid may be ethyl phosphonic acid, and the like. The amount of the proton conductor is in the range of 300 to 1,000 parts by weight based on 100 parts by weight of the total weight of the electrolyte membrane. The concentration of the acid used is not particularly limited. However, in the case of a phosphoric acid, 85 wt % of an aqueous phosphoric acid solution is used, and the impregnation time of the phosphoric acid is in the range of 2.5 to 14 hours at 80° C.

A method of manufacturing a membrane-electrode assembly for a fuel cell, according to aspects of the present invention, is as follows. The term "membrane and electrode assembly (MEA)" used herein refers to a structure in which an electrolyte membrane is disposed between two electrodes, each electrode comprising a catalyst layer and a diffusion layer. The MEA may be formed by positioning the electrode including the catalyst layer for an electrode described above at both sides of the electrolyte membrane, joining them all together at a high temperature and under a high pressure, and then joining a fuel diffusion layer to the catalyst layers. Herein, the joining is performed under a pressure in the range of 0.1 to 3 ton/cm$^2$, and particularly about 1 ton/cm$^2$, in a state reached when the MEA is heated up to a temperature that softens the electrolyte membrane.

Next, a bipolar plate is disposed on each side of the membrane-electrode assembly to manufacture a fuel cell. The bipolar plate has grooves used for supplying fuel and functions as a current collector. However, the fuel cell is not limited thereto such that a monopolar plate may be disposed on at least one side of the membrane-electrode assembly as needed.

The use of the fuel cell according to aspects of the present invention is not particularly limited. However, the fuel cell may be used as a polymer electrolyte membrane (PEM) fuel cell.

Hereinafter, aspects of the present invention will be described more specifically with reference to the following examples. The following examples are only for illustrative purposes and are not intended to limit the scope of the invention.

SYNTHESIS EXAMPLE 1

Preparation of tBuPh-4FA of Formula 3

1 mol of tertiary butylphenol, 2.2 mol of p-formaldehyde, and 1.1 mol of 4-fluoroaniline were mixed together, and the mixture was stirred at 100° C. for 1 hour without a solvent to obtain a crude product. The crude product was sequentially washed with an aqueous 1N NaOH solution twice and with distilled water once, and then dried using magnesium sulfate.

Subsequently, the resultant was filtered and then the solvent was removed therefrom. Then, the resultant was dried under vacuum to obtain tBuPh-4FA of Formula 3 with a yield of 95%. The structure of the obtained compound was confirmed through NMR spectrometry.

SYNTHESIS EXAMPLE 2

Preparation of 4FPh-246TFA of Formula 4

1 mol of 4-fluorophenol, 2.2 mol of p-formaldehyde, and 1.1 mol of 2,4,6-trifluoroaniline were mixed together, and the mixture was stirred at 100° C. for 1 hour without a solvent to obtain a crude product. The crude product was sequentially washed with an aqueous 1N NaOH solution twice and with distilled water once, and then dried using magnesium sulfate. Subsequently, the resultant was filtered and then the solvent was removed therefrom. Then, the resultant was dried under vacuum to obtain 4FPh-246TFA of Formula 4 with a yield of 95%. The structure of the obtained compound was confirmed through NMR spectrometry.

SYNTHESIS EXAMPLE 3

Preparation of poly[2,2'-(m-phenylene)-5,5'-bibenzimidazole] (PBI)

4.84 g of 3,3'-diaminobenzidine (22.6 mmol) and 3.76 g of isophthalic acid (22.6 mmol) were dissolved in a mixed solution of 8 g of $P_2O_5$, 30 ml of $CF_3SO_3H$, and 30 ml of $CH_3SO_3H$. The reaction mixture was reacted at 150° C. for 30 minutes under a nitrogen atmosphere. The more the reaction proceeded, the more the reaction mixture was changed to a homogeneous solution and the more the viscosity thereof was increased. To obtain polymer in the form of fine powder, a polymer solution that was still hot was poured into about 1.5 L of water using a peristaltic pump. The produced powder was washed using water several times, and the residue phosphoric acid in the polymer was filtered using a 10% ammonium hydroxide solution and a Soxhlet device until phosphorous residue was not confirmed present by elemental analysis. Next, the obtained polymer was dried under pressure at 50° C. for 3 days to obtain about 6 g of polymer (poly[2,2'-(m-phenylene)-5,5'-bibenzimidazole] (PBI)). The obtained PBI was precipitated using methanol, and the formed precipitate was washed with methanol to obtain PBI.

SYNTHESIS EXAMPLE 4

Preparation of Polybenzimidazole-Base Complex 50 g of dimethylacetamide was added to 5 g of the PBI powder prepared by Synthesis Example 3 to obtain 10 wt % of a PBI solution. 0.5 g of sodium carbonate was added to the PBI solution, and then the mixture was stirred at 80° C. for over 1 hour. Subsequently, the resultant was filtered to obtain a polybenzimidazole-base complex.

SYNTHESIS EXAMPLE 5

Preparation of HFa Represented by Formula 5

1 mol of 4,4'-hexafluoroisopropylidene diphenol (4,4'-HFIDPH), 4.4 mol of p-formaldehyde, and 2.2 mol of benzene were mixed together, and the mixture was stirred at 100° C. for 1 hour without a solvent to obtain a crude product. The crude product was sequentially washed with an aqueous 1N NaOH solution twice and with distilled water once and then dried using magnesium sulfate. Subsequently, the resultant was filtered and then the solvent was removed therefrom. Then, the resultant was dried under vacuum to obtain a benzoxazine-based monomer of Formula 5 where $R_2$ is a phenyl group with a yield of 96%. The structure of the obtained HFa was confirmed through NMR spectrometry.

EXAMPLE 1

Preparation of Fuel Cell 1 g of a catalyst in which 50 wt % of PtCo was supported on carbon and 3 g of NMP were added in a stirrer, and the mixture was stirred using a mortar to prepare a slurry. A NMP solution of tBuPh-4FA of Synthesis Example 1 was added to the slurry to make the resultant contain 0.025 g of tBuPh-4FA. The resultant was further stirred.

Subsequently, an N-methylpyrolidone (NMP) solution of 5 wt % of polyvinylidene fluoride was added to the resultant to make the resultant contain 0.025 g of polyvinylidene fluoride. The resultant was mixed for 10 minutes to prepare a slurry used for forming a cathode catalyst layer.

Carbon paper was cut to a size of 4×7 cm, fixed on a glass plate, and coated by a doctor blade (Sheen instrument). Herein, a gap interval was adjusted to 600 μm.

The slurry used for forming a cathode catalyst layer was coated on the carbon paper, and the resultant was dried at room temperature for 1 hour, dried at 80° C. for 1 hour, dried at 120° C. for 30 minutes, and dried at 150° C. for 15 minutes to prepare a cathode. The loading amount of PtCo in the prepared cathode was 2.32 mg/cm$^2$.

An electrode prepared by the following processes was used as an anode. 2 g of a catalyst in which 50 wt % of Pt was supported on carbon and 9 g of NMP were added to a stirrer, and the mixture was stirred for 2 minutes using a high speed stirrer.

Subsequently, a solution in which 0.05 g of polyvinylidene fluoride was dissolved in 1 g of NMP was added to the mixture, and the resultant was further stirred for 2 minutes to prepare a slurry used for forming an anode catalyst layer. The slurry used for forming an anode catalyst layer was coated on carbon paper coated with a microporous layer using a bar coater. As a result, preparation of the anode was completed. The loading amount of Pt in the prepared anode was 1.44 mg/cm$^2$.

Separately, 65 parts by weight of tBuPh-4FA of Formula 3 prepared by Synthesis Example 1 and 35 parts by weight of polybenzimidazole of Synthesis Example 3 were blended together, and then the mixture was cured at about 220° C. Subsequently, the resultant was impregnated with 85 wt % of phosphoric acid at 80° C. for over 4 hours to form an electrolyte membrane. Herein, the amount of phosphoric acid was about 459 parts by weight based on 100 parts by weight of the total weight of the electrolyte membrane.

The electrolyte membrane was disposed between the cathode and the anode to prepare an MEA. The cathode and anode were not impregnated with phosphoric acid.

To prevent gas permeation between the cathode and the anode, a TEFLON® membrane for a main gasket with a thickness of 200 μm and a TEFLON® membrane for a sub-gasket with a thickness of 20 μm were joined and disposed between the electrode and the electrolyte membrane.

Electricity was generated by causing hydrogen to flow into the anode (flowrate: 100 ccm) and causing air to flow into the cathode (flowrate: 250 ccm) at 150° C. under a condition where the electrolyte membrane was not humidified, and properties of the fuel cell prepared were measured. Herein, an electrolyte doped with a phosphoric acid was used, and thus the performance of the fuel cell improved as time elapsed. Thus, aging was performed until an operating voltage reached a peak, and then the properties of the fuel cell were finally evaluated. In addition, the area of the cathode and anode was fixed to a size of 2.8×2.8 (7.84 cm$^2$), and the thickness of the cathode was about 430 μm and the thickness of the anode was about 390 μm.

Voltage with respect to current density and time of aging of the fuel cell manufactured by Example 1 was measured. The results are shown in FIG. 1. In FIG. 1, d1 denotes a 1 day aging, d3 denotes a 3 day aging, d5 denotes a 5 day aging, and d7 denotes a 7 day aging. Referring to FIG. 1, it can be seen that the activation time was small, and the electrolyte membrane containing a large amount of a fluorine substituent exhibited a good cell voltage, i.e., 0.689 V @ 0.3 A/cm$^2$.

EXAMPLE 2

Manufacturing of a Fuel Cell

A cathode was prepared in the same manner as in Example 1, except that 2.5 parts by weight of 4FPh-246TFA of Formula 4 prepared by Synthesis Example 2 was used instead of tBuPh-4FA used in the preparation of the cathode, and the loading amount of PtCo in the completed cathode was 2.89 mg/cm$^2$. An anode was prepared in the same manner as in Example 1.

An electrolyte membrane was prepared in the same manner as in Example 1, except that 65 parts by weight of tBuPh-4FA of Formula 3 prepared by Synthesis Example 1 and 35 parts by weight of the polybenzimidazole-base complex of Synthesis Example 4 were used as the material for forming an electrolyte membrane, instead of 65 parts by weight of tBuPh-4FA of Formula 3 prepared by Synthesis Example 1 and 35 parts by weight of polybenzimidazole of Synthesis Example 3, and the amount of the phosphoric acid was about 550 parts by weight based on 100 parts by weight of the total weight of the electrolyte membrane.

A fuel cell was manufactured in the same manner as in Example 1 by using the cathode, anode, and electrolyte membrane.

Figure 2:
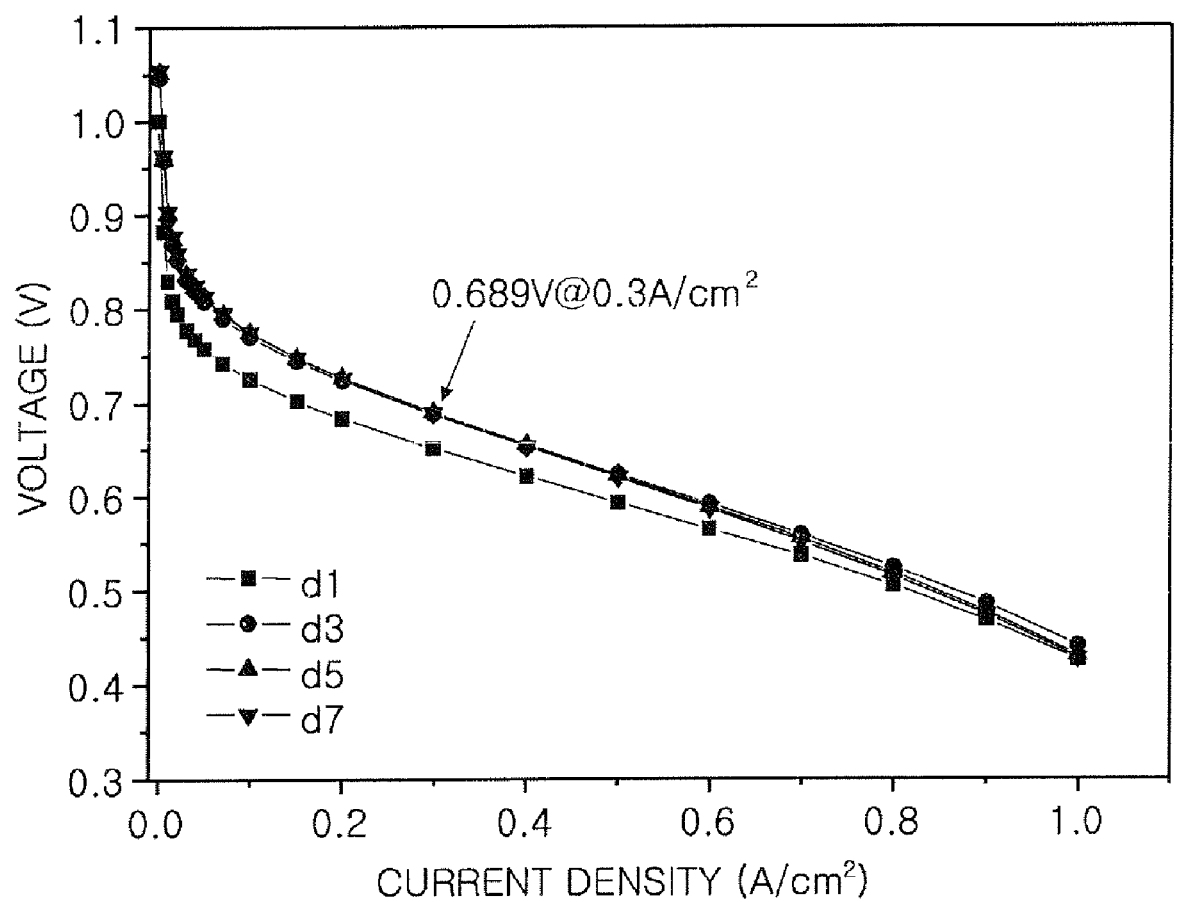
FIG. 2 is a graph of voltage with respect to current density of the fuel cell of Example 2 according to aspects of the present invention.

Voltage with respect to current density and time of aging of the fuel cell manufactured by Example 2 was measured. The results are shown in FIG. 2. In FIG. 2, d1 denotes a 1 day aging, d3 denotes a 3 day aging, d5 denotes a 5 day aging, and d7 denotes a 7 day aging. Referring to FIG. 2, it can be seen that activation time was small, and the electrolyte membrane containing a large amount of a fluorine substituent exhibited a good cell voltage, i.e., 0.689 V @ 0.3 A/cm$^2$. In addition, it can be seen that in the case of the electrolyte membrane comprising the PBI complex, there is no flooding of the electrodes in spite of the high impregnation rate.

EXAMPLE 3

Manufacture of Fuel Cell

A cathode was prepared in the same manner as in Example 1, except that a vinylidene fluoride-hexafluoropropylene copolymer was used instead of polyvinylidene fluoride and 2.5 parts by weight of 4FPh-246TFA of Formula 4 prepared by Synthesis Example 2 was used instead of tBuPh-4FA used in the preparation of the cathode, and the loading amount of PtCo in the completed cathode was 3.1005 mg/cm$^2$.

An anode was prepared in the same manner as in Example 1, except that the loading amount of Pt in the completed anode was 1.522 mg/cm$^2$.

An electrolyte membrane was prepared in the same manner as in Example 1, except that 60 parts by weight of tBuPh-4FA of Formula 3 prepared by Synthesis Example 1, 3 parts by weight of HFa of Formula 5 of Synthesis Example 5, and 37 parts by weight of polybenzimidazole prepared by Synthesis Example 3 were used as the material for forming an electrolyte membrane, instead of 65 parts by weight of tBuPh-4FA of Formula 3 prepared by Synthesis Example 1 and 35 parts by weight of polybenzimidazole, and the amount of the phosphoric acid was about 544 parts by weight based on 100 parts by weight of the total weight of the electrolyte membrane.

A fuel cell was manufactured in the same manner as in Example 1 by using the cathode, anode, and electrolyte membrane.

Figure 3:
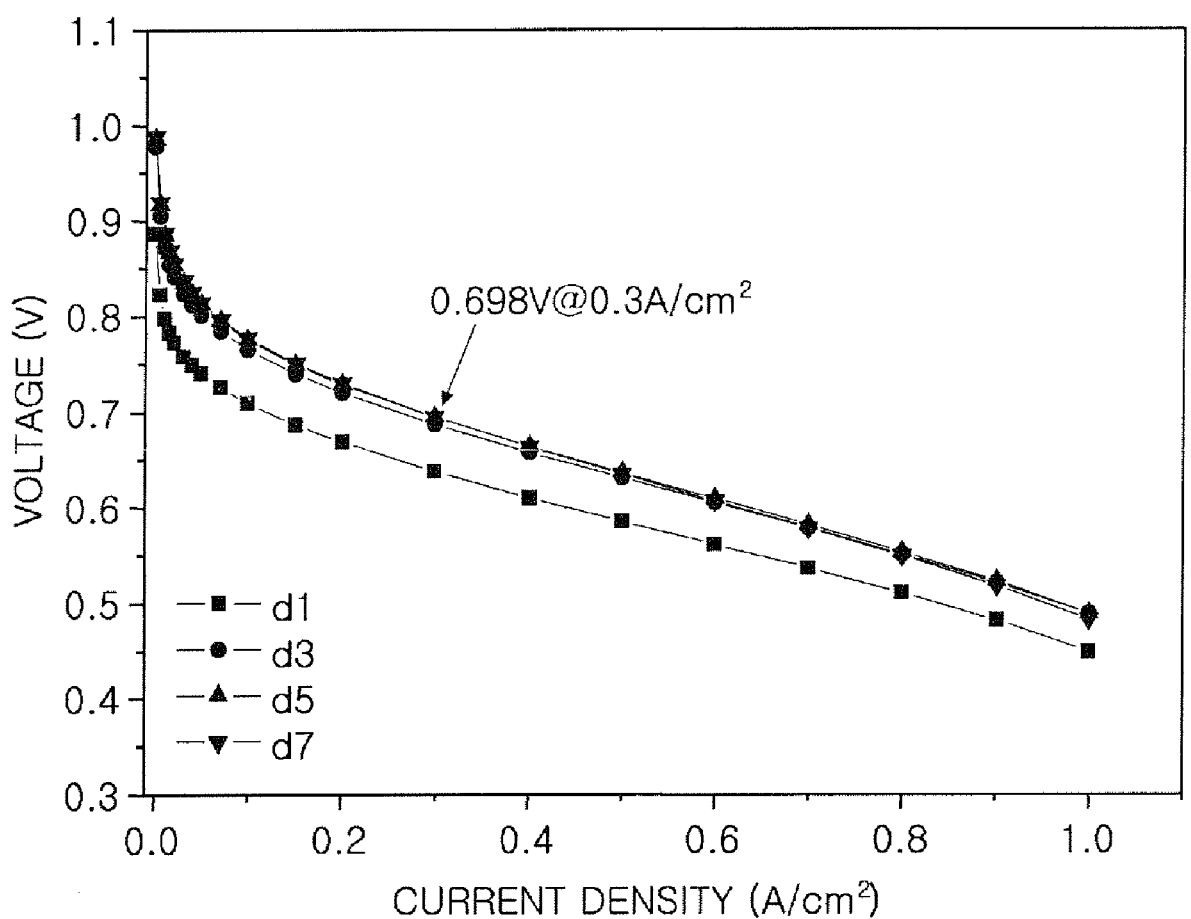
FIG. 3 is a graph of voltage with respect to current density of the fuel cell of Example 3 according to aspects of the present invention.

Voltage with respect to current density and time of aging of the fuel cell manufactured by Example 3, was measured. The results are shown in FIG. 3. In FIG. 3, d1 denotes a 1 day aging, d3 denotes a 3 day aging, d5 denotes a 5 day aging, and d7 denotes a 7 day aging. Referring to FIG. 3, it can be seen that activation time was small, and the electrolyte membrane containing a large amount of a fluorine substituent exhibited a good cell voltage, i.e., 0.698 V @ 0.3 A/cm$^2$.

EXAMPLE 4

Manufacturing of a Fuel Cell

A cathode was prepared in the same manner as in Example 1, except that 2.5 parts by weight of 4FPh-246TFA of Formula 4 prepared by Synthesis Example 2 was used instead of tBuPh-4FA used in the preparation of the cathode, and the loading amount of PtCo in the completed cathode was 3.1005 mg/cm$^2$.

An anode was prepared in the same manner as in Example 1.

An electrolyte membrane was prepared in the same manner as in Example 1, except that 60 parts by weight of tBuPh-4FA, 3 parts by weight of HFa of Formula 5 of Synthesis Example 5, and 37 parts by weight of polybenzimidazole prepared by Synthesis Example 3 were used as the material for forming an electrolyte membrane, instead of 65 parts by weight of tBuPh-4FA and 35 parts by weight of polybenzimidazole of Synthesis Example 3, and the amount of the phosphoric acid was about 544 parts by weight based on 100 parts by weight of the total weight of the electrolyte membrane.

A fuel cell was manufactured in the same manner as in Example 1 by using the cathode, anode, and electrolyte membrane.

Figure 4:
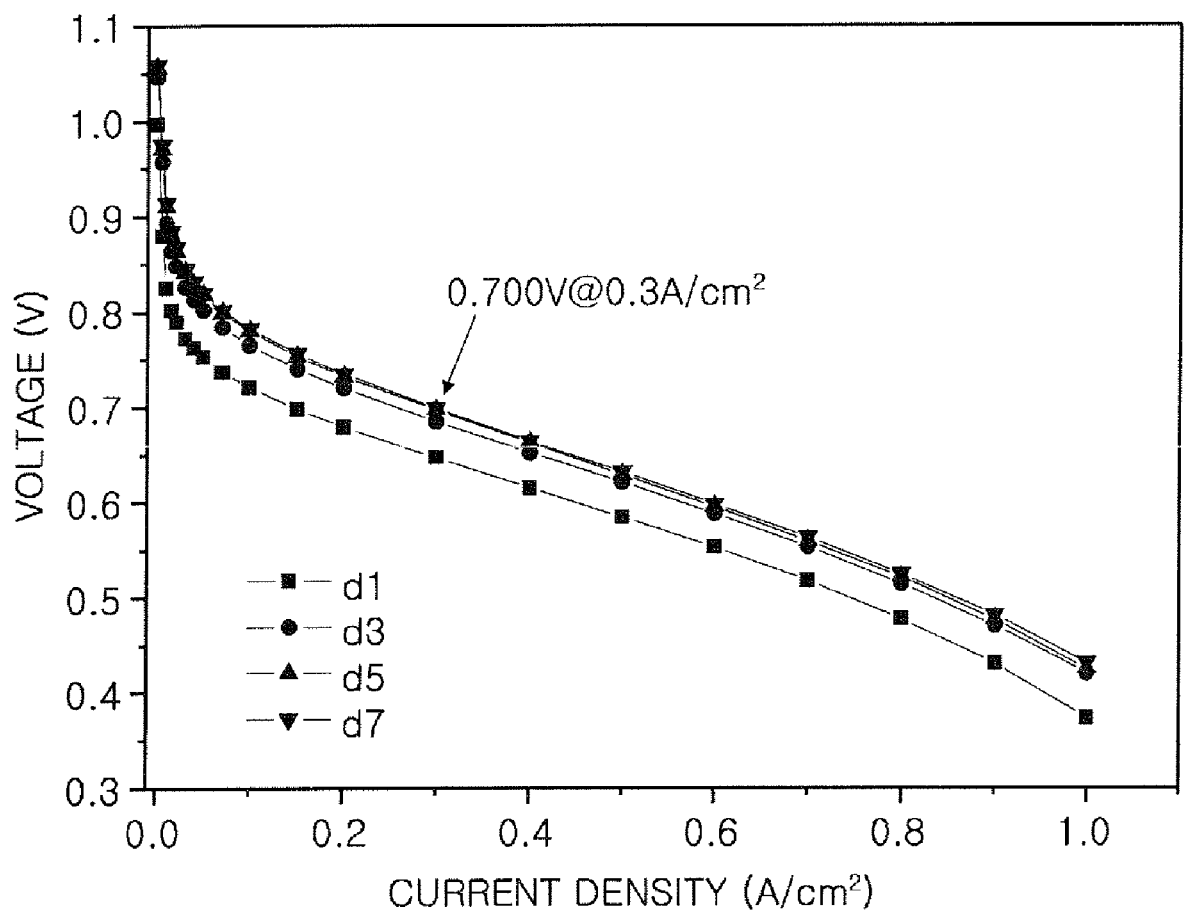
FIG. 4 is a graph of voltage with respect to current density of the fuel cell of Example 4 according to aspects of the present invention.

Voltage with respect to current density and time of aging of the fuel cell manufactured by Example 4 was measured. The results are shown in FIG. 4. In FIG. 4, d1 denotes a 1 day aging, d3 denotes a 3 day aging, d5 denotes a 5 day aging, and d7 denotes a 7 day aging. Referring to FIG. 4, it can be seen that activation time was small, and the electrolyte membrane containing a large amount of a fluorine substituent exhibited good cell voltage, i.e., 0.700 V @ 0.3 A/cm$^2$. In addition, it can be seen that in the case of the electrolyte membrane comprising the PBI complex, there is no flooding of the electrodes in spite of the high impregnation rate.

EXAMPLE 5

Manufacturing of a Fuel Cell

A cathode was prepared in the same manner as in Example 1, except that 2.5 parts by weight of 4FPh-246TFA of Formula 4 prepared by Synthesis Example 2 was used instead of tBuPh-4FA used in the preparation of the cathode, and the loading amount of PtCo in the completed cathode was 3.1005 mg/cm².

An anode was prepared in the same manner as in Example 1.

An electrolyte membrane was prepared in the same manner as in Example 1, except that 60 parts by weight of tBuPh-4FA, 3 parts by weight of HFa of Formula 5 of Synthesis Example 5, and 37 parts by weight of the polybenzimidazole-base complex prepared by Synthesis Example 4 were used as the material for forming an electrolyte membrane, instead of 65 parts by weight of tBuPh-4FA and 35 parts by weight of polybenzimidazole of Synthesis Example 3, and the amount of the phosphoric acid was about 544 parts by weight based on 100 parts by weight of the total weight of the electrolyte membrane.

A fuel cell was manufactured in the same manner as in Example 1 by using the cathode, anode and electrolyte membrane.

COMPARATIVE EXAMPLE 1

Manufacturing of a Fuel Cell

A cathode was prepared in the same manner as in Example 1, except that the electrolyte membrane was formed of polybenzimidazole, not by using 4FPh-246TFA of Formula 4 in the preparation of the cathode, and a fuel cell using the cathode was manufactured in the same manner as in Example 2.

Figure 5:
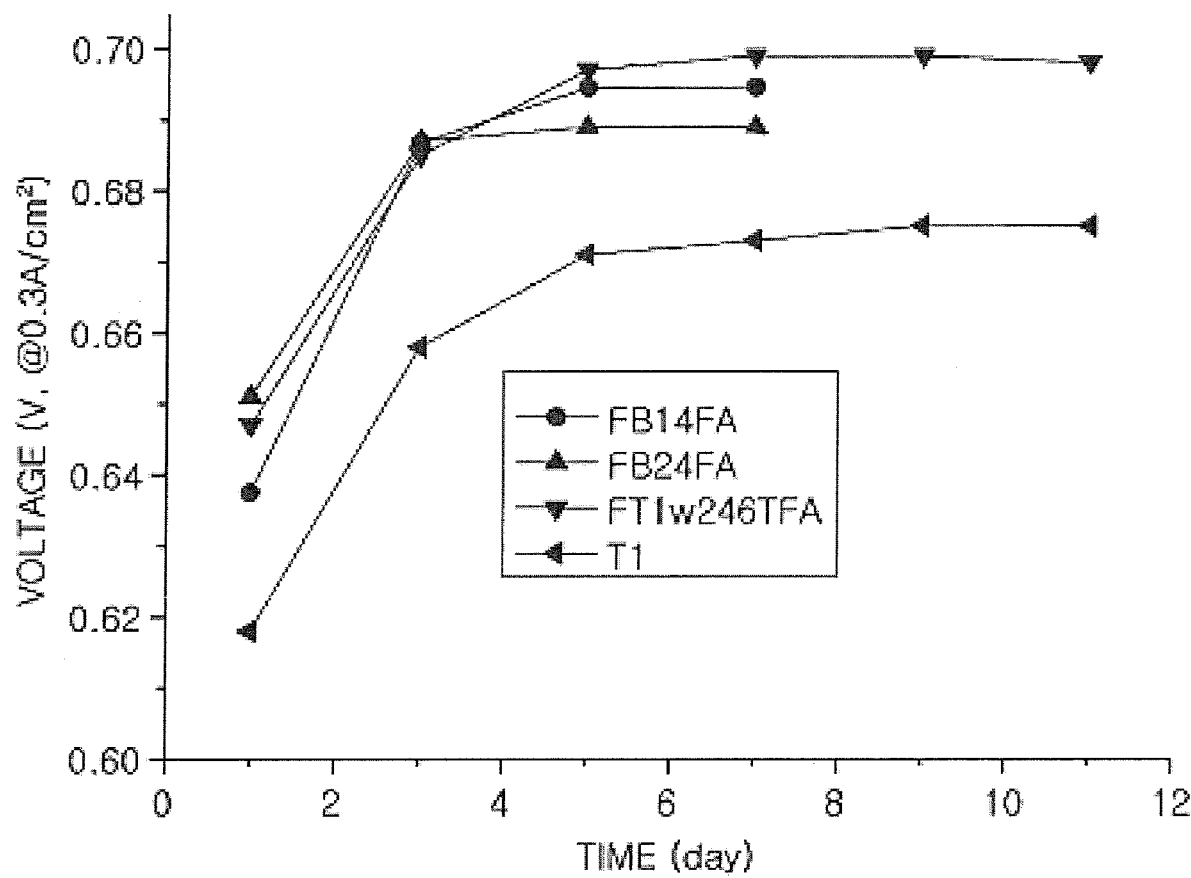
FIG. 5 is a graph of voltage with respect to time of the fuel cells of Examples 1 through 3 and Comparative Example 1 according to aspects of the present invention.

Voltage with respect to time of the fuel cells of Examples 1 through 3 and Comparative Example 1 was measured. The results are shown in FIG. 5. In FIG. 5, FB14FA represents Example 1, FB24FA represents Example 2, FT1w246TFA represents Example 3, and T1represents Comparative Example. Referring to FIG. 5, it can be seen that the fuel cells of Examples 1 through 3 exhibit improved voltage performance through fast activation compared to that of the fuel cell of Comparative Example 1.

Figure 6:
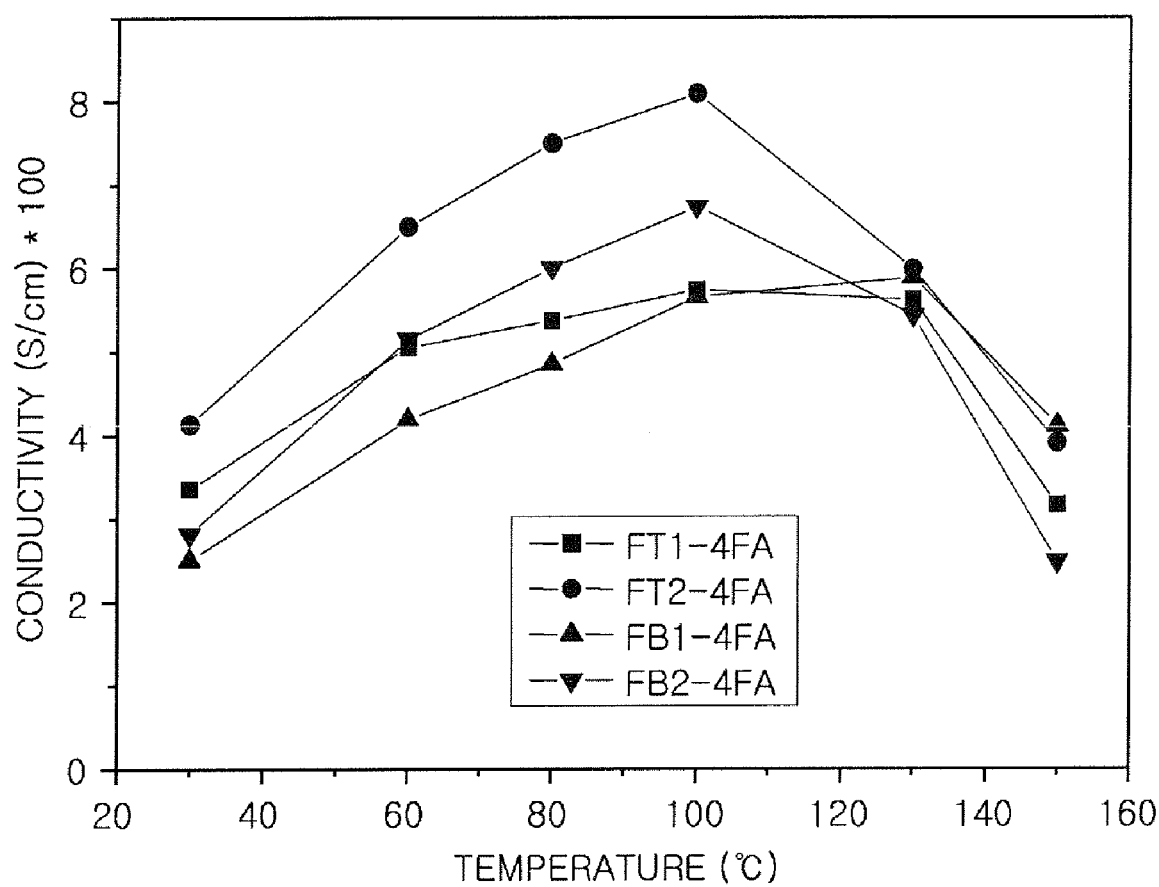
FIG. 6 is a graph of conductivity with respect to temperature of each of the fuel cells of Examples 1, 2, 3, and 5.

Conductivity with respect to temperature of each of the electrolyte membranes prepared by Example 1, Example 2, Example 3, and Example 5 was measured. The results are shown in FIG. 6. In FIG. 6, FT1-4FA represents the electrolyte membrane of Example 3, FT2-4FA represents the electrolyte membrane of Example 5, FB1-4FA represents the electrolyte membrane of Example 1, and FB2-4FA represents the electrolyte membrane of Example 2. Referring to FIG. 6, it can be seen that each of the electrolyte membranes of Examples 1, 2, 3 and 5 has excellent ionic conductivity.

In addition, a mechanical property and resistance to a phosphoric acid of each of the electrolyte membranes of Examples 1, 2, 3 and 5 were evaluated. As a result of the evaluation, it can be confirmed that the electrolyte membranes of Examples 1, 2, 3 and 5 have excellent mechanical properties and impregnation capability with respect to the phosphoric acid and also have good resistance to the phosphoric acid.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte membrane for a fuel cell, comprising:
a crosslinked polybenzoxazine-based compound formed of a benzoxazine-based monomer represented by Formula 1 below crosslinked with a cross-linkable compound,

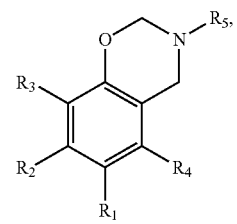

<Formula 1> wherein $R_1$ is a halogen atom, and $R_2$ through $R_4$ are hydrogen, and $R_5$ is an aryl group selected from groups represented by the formulae below:

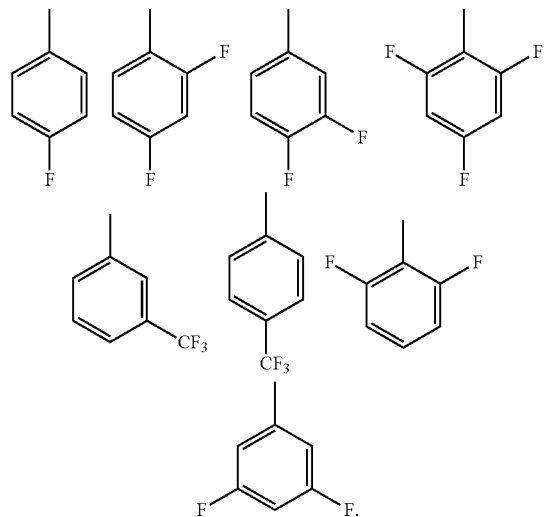

2. A fuel cell comprising:
a cathode;
an anode; and
an electrolyte membrane disposed between the cathode and the anode,
wherein the electrolyte membrane comprises a crosslinked polybenzoxazine-based compound formed of at least one monomer selected from a first benzoxazine-based monomer represented by Formula 1 or Formula 3 below cross-linked with a cross-linkable compound and a second benzoxazine-based monomer represented by Formula 5 below crosslinked with a cross-linkable compound,

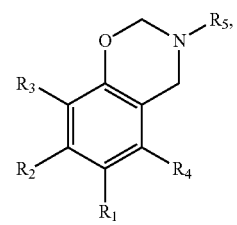

<Formula 1> wherein R1 is a halogen atom, and R2 through R4 are hydrogen, R5 is an aryl group selected by groups represented by the formulae below:

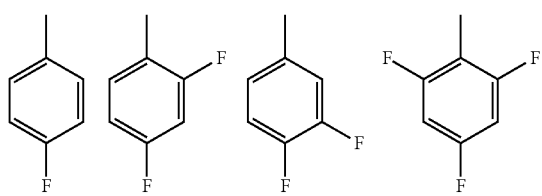

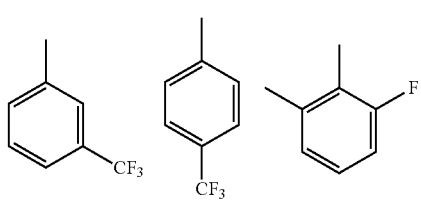

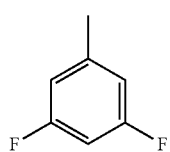

<Formula 3>

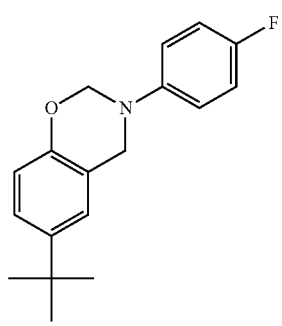

<Formula 5>

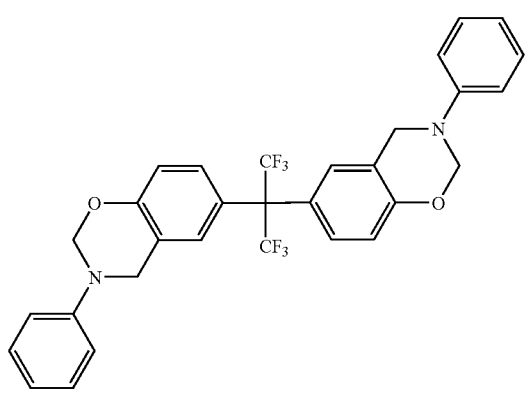

wherein at least one of the anode and the cathode comprises a catalyst layer comprising a polymer of a benzoxazine-based monomer represented by Formula 4 below.

<Formula 4>

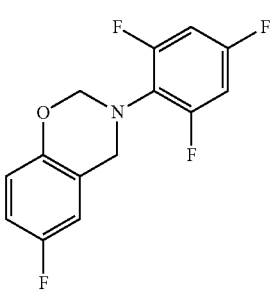

3. The fuel cell of claim 2, wherein the catalyst layer further comprises at least one binder selected from the group consisting of poly(vinylidenefluoride), polytetrafluoroethylene (PTFE), a tetrafluoroethylene-hexafluoroethylene copolymer, fluorinated ethylene propylene (FEP), styrene butadiene rubber (SBR), and polyurethane.

4. The fuel cell of claim 2, wherein an amount of the binder is in the range of 0.1 to 50 parts by weight based on 100 parts by weight of the catalyst.

5. The fuel cell of claim 2, wherein the catalyst layer further comprises a proton conductor.

6. The fuel cell of claim 5, wherein the proton conductor is a phosphoric acid or a $C_1$-$C_{20}$ organic phosphonic acid.

7. The fuel cell of claim 2, wherein an amount of the polymer of at least one selected benzoxazine-based monomer of the polymer of the at least one of the cathode and the anode is in the range of 0.1 to 50 parts by weight based on 100 parts by weight of the catalyst.

8. The fuel cell of claim 2, wherein the first benzoxazine-based monomer represented by Formula 1 is a benzoxazine-based monomer represented by Formula 4

<Formula 4>

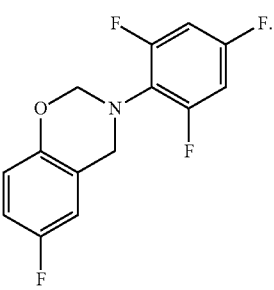

9. An electrolyte membrane for a fuel cell, which comprises a crosslinked polybenzoxazine-based compound formed of a benzoxazine-based monomer represented by Formula 4 below crosslinked with a cross-linkable compound <Formula 4>

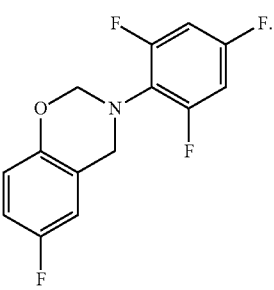

10. The electrolyte membrane of claim 9, wherein the cross-linkable compound is at least one selected from the group consisting of polybenzimidazoles (PBI), a polybenzimidazole-base complex, polybenzthiazoles, polybenzoxazoles, and polyimides.

11. The electrolyte membrane of claim 9, wherein an amount of the cross-linkable compound is in the range of 5 to 95 parts by weight based on 100 parts by weight of the total weight of at least one selected from the first benzoxazine-based monomer and the second benzoxazine-based monomer.

12. The electrolyte membrane of claim 9, further comprising a proton conductor.

13. The electrolyte membrane of claim 12, wherein the proton conductor is a phosphoric acid or a $C_1$-$C_{20}$ organic phosphonic acid.

14. A fuel cell comprising:
a cathode;
an anode; and
the electrolyte membrane according to claim 9 disposed between the cathode and the anode.

15. The fuel cell of claim 14, wherein the catalyst layer further comprises at least one binder selected from the group consisting of poly(vinylidenefluoride), polytetrafluoroethylene (PTFE), a tetrafluoroethylene-hexafluoroethylene copolymer, fluorinated ethylene propylene (FEP), styrene butadiene rubber (SBR), and polyurethane.

16. The fuel cell of claim 15, wherein an amount of the binder is in the range of 0.1 to 50 parts by weight based on 100 parts by weight of the catalyst.

17. The fuel cell of claim 15, wherein the catalyst layer further comprises a proton conductor.

18. The fuel cell of claim 17, wherein the proton conductor is a phosphoric acid or a $C_1$-$C_{20}$ organic phosphonic acid.

19. The fuel cell of claim 14, wherein an amount of the polymer of at least one selected benzoxazine-based monomer of the polymer of the at least one of the cathode and the anode is in the range of 0.1 to 50 parts by weight based on 100 parts by weight of the catalyst.

20. A fuel cell comprising:
a cathode;
an anode; and
an electrolyte membrane disposed between the cathode and the anode,
wherein the electrolyte membrane comprises a crosslinked polybenzoxazine-based compound formed of a benzoxazine-based monomer represented by Formula 3 below crosslinked with a cross-linkable compound,

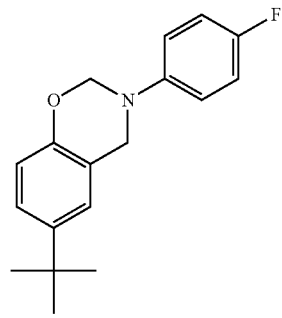

<Formula 3> and wherein at least one of the anode and the cathode comprises a catalyst and a polymer of a benzoxazine-based monomer represented by Formula 4 below.

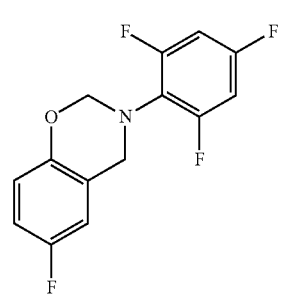

<Formula 4>

21. The fuel cell of claim 20, wherein the catalyst layer further comprises at least one binder selected from the group consisting of poly(vinylidenefluoride), polytetrafluoroethylene (PTFE), a tetrafluoroethylene-hexafluoroethylene copolymer, fluorinated ethylene propylene (FEP), styrene butadiene rubber (SBR), and polyurethane.

22. The fuel cell of claim 20, wherein an amount of the binder is in the range of 0.1 to 50 parts by weight based on 100 parts by weight of the catalyst.

23. The fuel cell of claim 20, wherein the catalyst layer further comprises a proton conductor.

24. The fuel cell of claim 23, wherein the proton conductor is a phosphoric acid or a $C_1$-$C_{20}$ organic phosphonic acid.

25. The fuel cell of claim 20, wherein an amount of the polymer of at least one selected benzoxazine-based monomer of the polymer of the at least one of the cathode and the anode is in the range of 0.1 to 50 parts by weight based on 100 parts by weight of the catalyst.

* * * * *

UNITED STATES PATENT AND TRADEMARK OFFICE
CERTIFICATE OF CORRECTION

PATENT NO. : 8,323,849 B2
APPLICATION NO. : 11/947011
DATED : December 4, 2012
INVENTOR(S) : Seong-Woo Choi et al.

Page 1 of 1

It is certified that error appears in the above-identified patent and that said Letters Patent is hereby corrected as shown below:

Page 2, Column 2, OTHER PUBLICATIONS, insert --Search Report issued by European Patent Office in European Patent Application No. 08104319.2-2119 on October 13, 2008--;

Column 19, Claim 2, line 63, after the formula, insert --, and--.

Signed and Sealed this
Twelfth Day of February, 2013

Teresa Stanek Rea
*Acting Director of the United States Patent and Trademark Office*